(12) United States Patent
Soni et al.

(10) Patent No.: US 11,176,275 B2
(45) Date of Patent: Nov. 16, 2021

(54) DE-IDENTIFYING SOURCE ENTITY DATA

(71) Applicant: INTERNATIONAL BUSINESS MACHINES CORPORATION, Armonk, NY (US)

(72) Inventors: Kalp Soni, Mandla (IN); Prashant Singh, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 226 days.

(21) Appl. No.: 16/505,023

(22) Filed: Jul. 8, 2019

(65) Prior Publication Data

US 2021/0012030 A1   Jan. 14, 2021

(51) Int. Cl.
*G06F 21/62* (2013.01)
(52) U.S. Cl.
CPC .................... *G06F 21/6254* (2013.01)
(58) Field of Classification Search
CPC .................... G06F 21/6254; G06F 21/64
See application file for complete search history.

(56) References Cited

U.S. PATENT DOCUMENTS

| | | | |
|---|---|---|---|
| 8,924,402 B2 | 12/2014 | Fuh et al. | |
| 10,706,046 B2 * | 7/2020 | Werner | G06F 16/2393 |
| 10,838,987 B1 * | 11/2020 | Edwards | G06F 16/23 |
| 2012/0041791 A1 * | 2/2012 | Gervais | G06F 21/6254 |
| | | | 705/4 |
| 2014/0122442 A1 * | 5/2014 | Takenouchi | G06F 16/2365 |
| | | | 707/687 |

(Continued)

FOREIGN PATENT DOCUMENTS

JP   2013246547 A1   12/2013

OTHER PUBLICATIONS

Jahan, T., et al., "A Comparative Study of Data Perturbation Using Fuzzy Logic to Preserve Privacy", Networks and Communications (NetCom2013), Lecture Notes in Electrical Engineering 284, DOI 10.1007/978-3-319-03692-2_13, Springer International Publishing Switzerland 2014, 11 pgs.

(Continued)

*Primary Examiner* — Joseph P Hirl
*Assistant Examiner* — Stephen T Gundry
(74) *Attorney, Agent, or Firm* — William Hartwell; Matthew M. Hulihan; Heslin Rothenberg Farley & Mesiti PC

(57) ABSTRACT

De-identification of source entity data is provided, in which a process obtains source entity data having an entity identifier and entity attribute data in respective formats for entity attributes of that entity, obtains a predefined library of fictitious entities with corresponding fictitious entity attribute data, for the entity attributes, that is in the respective formats, and generates a de-identified entity lookup list by applying a transformation to the entity identifier to produce a transformed entity identifier, selecting a fictitious entity from the predefined library of fictitious entities, and writing to the de-identified entity lookup list the entity identifier, the transformed entity identifier, and the fictitious entity attribute data, for the entity attributes, that corresponds to the selected fictitious entity. The process also processes entity file(s) using the de-identified entity lookup list to de-identify the entity and produces de-identified entity file(s).

20 Claims, 17 Drawing Sheets

(56) References Cited

U.S. PATENT DOCUMENTS

| | | | |
|---|---|---|---|
| 2015/0169895 A1* | 6/2015 | Gkoulalas-Divanis ..................... G06F 21/6254 726/26 | |
| 2016/0203336 A1* | 7/2016 | Nambiar ............. G06F 21/6245 726/26 | |
| 2017/0061156 A1* | 3/2017 | Hamamoto ......... H04L 63/0421 | |
| 2018/0060546 A1* | 3/2018 | Yin ....................... H04W 4/021 | |
| 2018/0232536 A1* | 8/2018 | Fineman ............. H04L 63/0421 | |
| 2018/0300506 A1* | 10/2018 | Kawakami ............. G16H 10/60 | |
| 2018/0322309 A1 | 11/2018 | Matejka et al. | |
| 2019/0377901 A1* | 12/2019 | Balzer ................. G06F 21/6254 | |
| 2020/0218741 A1* | 7/2020 | Ahuja .................... G06N 20/00 | |
| 2020/0251111 A1* | 8/2020 | Temkin ............... G06F 16/2423 | |
| 2020/0252372 A1* | 8/2020 | Bilsten .................. G06F 16/955 | |
| 2020/0287940 A1* | 9/2020 | Brannon ............. G06F 16/9038 | |
| 2020/0314147 A1* | 10/2020 | Brannon ............... G06F 21/552 | |
| 2020/0322387 A1* | 10/2020 | Brannon ................. H04L 63/20 | |
| 2020/0341965 A1* | 10/2020 | Gupta ................. G06F 21/6254 | |
| 2020/0402625 A1* | 12/2020 | Aravamudan ........ G06F 21/602 | |
| 2020/0409945 A1* | 12/2020 | Chen ....................... G06F 16/25 | |
| 2021/0042333 A1* | 2/2021 | Edwards ............... G06F 16/215 | |
| 2021/0084077 A1* | 3/2021 | Brannon ............. G06F 16/9038 | |

OTHER PUBLICATIONS

Bazai, S., et al., "Anonymizing k-NN Classification on MapReduce", ICST Institute for Computer Sciences, Social Informatics and Telecommunications Engineering 2018, MONAMI 2017, LNICST 235, pp. 364-377.

Mell, Peter, et al., "The NIST Definition of Cloud Computing", NIST Special Publication 800-145, Sep. 2011, Gaithersburg, MD, 7 pgs.

* cited by examiner

PERSON FILE:

"PERSON_ID","PERSON_TYPE","LAST_NAME","FIRST_NAME","MIDDLE_NAME","PREFERRED_NAME","GENDER","BIRTHDATE","PICTURE","PREFIX","PRONUNCIATON","SUFFIX","DATA_AS_OF_DATE"

"S-14914","Student","Daniel","Carlos","Chase","","M","2002-02-26","","","","","2018-05-28"
...
...

PERSON DATA REPOSITORY:

*Number,Gender,Title,GivenName,MiddleInitial,Surname,StreetAddress,City,State,StateFull,ZipCode,Country,CountryFull,EmailAddress,TelephoneNumber,TelephoneCountryCode,EyeColor*

1,male,Mr.,Nicholas,S,Smith,1679 Lawman Avenue,Falls Church,VA,Virginia,22042,US,United States,NicholasSSmith@superrito.com,703-206-4389,1,Brown 2,male,Mr.,Connor,J,Rowe,3282 Burnside Court,Phoenix,AZ,Arizona,85034,US,United States,ConnorRowe@fleckens.hu,602-334-7130,1,Blue 3,male,Mr.,Andreas,J,Schroeder,2615 Brown Bear Drive,Riverside,CA,California,92501,US,United States,AndreasSchroeder@cuvox.de,951-715-4927,1,Green 4,male,Mr.,Yong,M,Lo,13 Oakridge Lane,Dallas,TX,Texas,75234,US,United States,YongLo@jourrapide.com,469-879-0311,1,Green

DE-IDENTIFIED PERSON LOOKUP LIST:

header
*"PERSON_ID","ANON_PERSON_ID","FIRST_NAME","ANON_FIRST_NAME","LAST_NAME","ANON_LASTNAME","GENDER","StreetAddress","City","State","StateFull","ZipCode","Country","CountryFull","EmailAddress","TelephoneNumber"*

People
"S-14914","A-G-96196 ","Carlos","Nicholas","Daniel","Smith","M","1679 Lawman Avenue","Falls Church","VA","Virginia",22042,"US","United States","NicholasSSmith@superrito.com","703-206-4389"
...
...

DE-IDENTIFIED PERSON FILE:

"PERSON_ID","PERSON_TYPE","LAST_NAME","FIRST_NAME","MIDDLE_NAME","PREFERRED_NAME","GENDER","BIRTHDATE","PICTURE","PREFIX","PRONUNCIATON","SUFFIX","DATA_AS_OF_DATE"

"A-G-96196","Student","Smith","Nicholas","Chase","Nicholas","M","2002-03-13","","","","","2018-05-28"
...
...

PERSON_ADDRESS FILE:

"PERSON_ID","ADDRESS_LINE_ONE","ADDRESS_LINE_TWO","CITY","STATE","COUNTRY","ZIPCODE","PERSON_TYPE","DATE_ADDED","IS_ACTIVE_YN","ADDRESS_TYPE","DATA_AS_OF_DATE"

"S-14914","11 Pecan Grove Circle","","Allen","TX","USA","75002","Student","","1","HOME MAILING","2018-05-28"
...
...

DE-IDENTIFIED PERSON_ADDRESS FILE:

*"PERSON_ID","ADDRESS_LINE_ONE","ADDRESS_LINE_TWO","CITY","STATE","COUNTRY","ZIPCODE","PERSON_TYPE","DATE_ADDED","IS_ACTIVE_YN","ADDRESS_TYPE","DATA_AS_OF_DATE"*

"A-G-96196","1679 Lawman Avenue","","Falls Church","VA","USA","22042","Student","","1","HOME MAILING","2018-05-28"
...
...

PERSON_EMAIL FILE:

*"PERSON_ID","EMAIL_ADDRESS","PERSON_TYPE","EMAIL_PRIMARY_YN","EMAIL_TYPE","IS_ACTIVE_YN","DATA_AS_OF_DATE"*

"S-14914","Daniel_Carlos@example.com","STUDENT","1","School","1","2018-05-28"
...
...

DE-IDENTIFIED PERSON_EMAIL FILE:

*"PERSON_ID","EMAIL_ADDRESS","PERSON_TYPE","EMAIL_PRIMARY_YN","EMAIL_TYPE","IS_ACTIVE_YN","DATA_AS_OF_DATE"*

"A-G-96196","NicholasSSmith@superrito.com","STUDENT","1","School","1","2018-05-28"
...
...

PERSON_TELEPHONE FILE:

*"PERSON_ID","TELEPHONE_NUMBER","PERSON_TYPE","TELEPHONE_AVAILABLE_TIME","TELEPHONE_CALL_YN","TELEPHONE_TEXT_YN","TELEPHONE_PRIMARY_YN","IS_ACTIVE_YN","TELEPHONE_TYPE","DATA_AS_OF_DATE"*

"S-14914","2147046539","Student","04:OO PM TO 08:00 PM","1","0","0","1","H","2018-05-28"
...
...

DE-IDENTIFIED PERSON_TELEPHONE FILE:

*"PERSON_ID","TELEPHONE_NUMBER","PERSON_TYPE","TELEPHONE_AVAILABLE_TIME","TELEPHONE_CALL_YN","TELEPHONE_TEXT_YN","TELEPHONE_PRIMARY_YN","IS_ACTIVE_YN","TELEPHONE_TYPE","DATA_AS_OF_DATE*
"
"A-G-96196","703-206-4389","Student","04:OO PM TO 08:00 PM","1","0","0","1","H","2018-05-28"
...
...

FIG. 14

DE-IDENTIFYING SOURCE ENTITY DATA

BACKGROUND

With web-based front-end or other types of client-facing software, including software used for demonstration (demo) and training purposes, it is usually desired to provide an environment with the same look and feel of the production environment that the software is demoing or training. For the proper testing of the various builds delivered by the development teams, it may be desired to use production-like data to test the code efficiently and accurately. One approach is to use actual customer/client data in the demo/training environment, but it is necessary to keep from exposing any personally identifiable information, also referred to in the field as sensitive personal information, personally identifying information, personal identifying information, personal identifiable information, personal information, and/or personal data, and typically abbreviated "PII" or "SPI".

SUMMARY

Shortcomings of the prior art are overcome and additional advantages are provided through the provision of a computer-implemented method. The method obtains source entity data that includes an entity identifier that uniquely identifies an entity and entity attribute data in respective entity attribute formats for entity attributes of that entity. The method also obtains a predefined library of fictitious entities with corresponding fictitious entity attribute data, for the entity attributes, that is in the respective entity attribute formats. The method generates a de-identified entity lookup list correlating the entity identifier of the entity to a fictitious entity of the predefined library. The generating includes applying a transformation to the entity identifier to produce a transformed entity identifier, selecting a fictitious entity from the predefined library of fictitious entities, and writing to the de-identified entity lookup list the entity identifier, the transformed entity identifier, and the fictitious entity attribute data, for the entity attributes, that corresponds to the selected fictitious entity. The method also processes entity file(s) of the source entity data using the de-identified entity lookup list to de-identify the entity. The processing produces corresponding de-identified entity file(s) in which the entity is identified by the transformed entity identifier and in which at least some fictitious entity attribute data from the de-identified entity lookup list is used in place of entity attribute data included in the one or more entity files.

Further, a computer system is provided that includes a memory and a processor in communication with the memory, wherein the computer system is configured to perform a method. The method obtains source entity data that includes an entity identifier that uniquely identifies an entity and entity attribute data in respective entity attribute formats for entity attributes of that entity. The method also obtains a predefined library of fictitious entities with corresponding fictitious entity attribute data, for the entity attributes, that is in the respective entity attribute formats. The method generates a de-identified entity lookup list correlating the entity identifier of the entity to a fictitious entity of the predefined library. The generating includes applying a transformation to the entity identifier to produce a transformed entity identifier, selecting a fictitious entity from the predefined library of fictitious entities, and writing to the de-identified entity lookup list the entity identifier, the transformed entity identifier, and the fictitious entity attribute data, for the entity attributes, that corresponds to the selected fictitious entity. The method also processes entity file(s) of the source entity data using the de-identified entity lookup list to de-identify the entity. The processing produces corresponding de-identified entity file(s) in which the entity is identified by the transformed entity identifier and in which at least some fictitious entity attribute data from the de-identified entity lookup list is used in place of entity attribute data included in the one or more entity files.

Yet further, a computer program product including a computer readable storage medium readable by a processing circuit and storing instructions for execution by the processing circuit is provided for performing a method. The method obtains source entity data that includes an entity identifier that uniquely identifies an entity and entity attribute data in respective entity attribute formats for entity attributes of that entity. The method also obtains a predefined library of fictitious entities with corresponding fictitious entity attribute data, for the entity attributes, that is in the respective entity attribute formats. The method generates a de-identified entity lookup list correlating the entity identifier of the entity to a fictitious entity of the predefined library. The generating includes applying a transformation to the entity identifier to produce a transformed entity identifier, selecting a fictitious entity from the predefined library of fictitious entities, and writing to the de-identified entity lookup list the entity identifier, the transformed entity identifier, and the fictitious entity attribute data, for the entity attributes, that corresponds to the selected fictitious entity. The method also processes entity file(s) of the source entity data using the de-identified entity lookup list to de-identify the entity. The processing produces corresponding de-identified entity file(s) in which the entity is identified by the transformed entity identifier and in which at least some fictitious entity attribute data from the de-identified entity lookup list is used in place of entity attribute data included in the one or more entity files.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 depicts an example entity file of source entity data, in accordance with aspects described herein;

FIG. 4 depicts an example predefined library of fictitious entities, in accordance with aspects described herein;

FIG. 5 depicts an example de-identified entity lookup list, in accordance with aspects described herein;

FIG. 8 depicts an example de-identified entity file corresponding to the entity file of FIG. 2, in accordance with aspects described herein;

FIG. 9 depicts another example entity file, in accordance with aspects described herein;

FIG. 10 depicts an example de-identified entity file corresponding to the entity file of FIG. 9, in accordance with aspects described herein;

FIG. 11 depicts another example entity file, in accordance with aspects described herein;

FIG. 12 depicts an example de-identified entity file corresponding to the entity file of FIG. 11, in accordance with aspects described herein;

FIG. 13 depicts another example entity file, in accordance with aspects described herein;

FIG. 14 depicts an example de-identified entity file corresponding to the entity file of FIG. 13, in accordance with aspects described herein;

DETAILED DESCRIPTION

Figure 1:
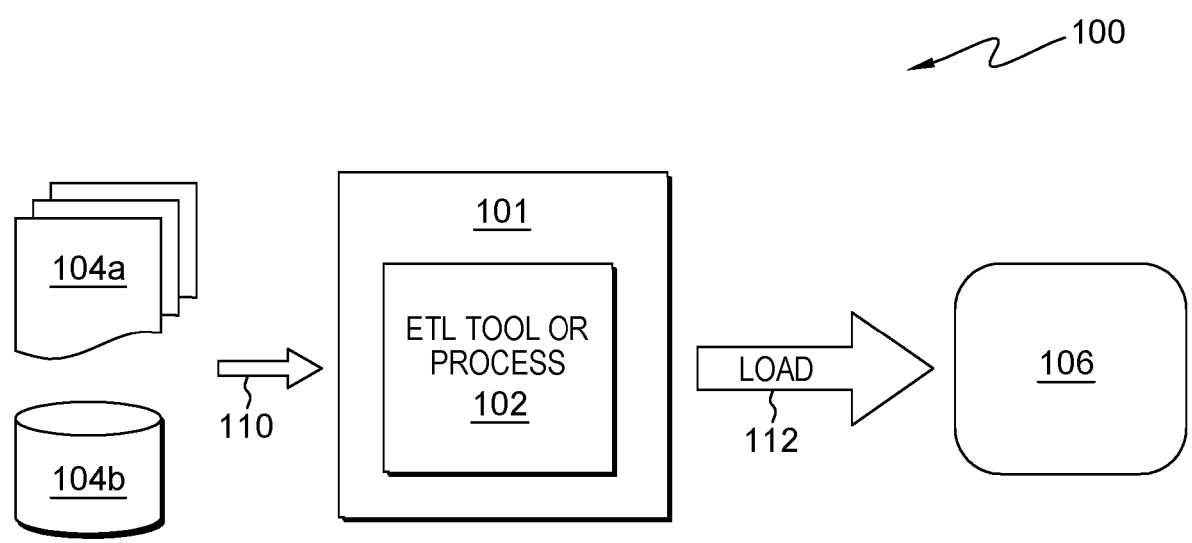
FIG. 1 depicts an example environment to incorporate and use aspects described herein.

Using actual data in a demo/training environment has it benefits but only at the risk of exposing PII of that data. As a result, what is needed is a robust de-identification approach useful for de-identifying data of available PII fields and in a repeatable manner that is applicable to incremental data updates (as opposed to de-identifying in the software itself) and that can be run as, and when, desired in training, demo, and test environments. It may be that incremental data updates are received daily. An approach to de-identify such incremental data would be useful.

One existing approach for de-identifying PII data is masking the original data. A drawback of this approach is that it fails to yield realistic data that would be expected in a production environment. Masking masks the PII information using a mask. An example masking of the data '4203655' is '4203XXX', which is not ideal or realistic for real world demo needs, as most information reflected as 'XXX' does not provide an accurate feel of the production data.

Another approach for de-identifying is to apply a data swapping technique. This approach uses the same data from various fields across multiple records, thus providing de-identifying data at the record level but not the field level. Fields like phone numbers, employee identifiers (IDs), addresses, email addresses, and so on may be exposed from the original data by viewing the collection of 'de-identified' records, and therefore is not effective for protecting sensitive information.

Yet another approach is micro aggregation/k-anonymity group-based de-identification technique. This works on a group of records selecting a specific attribute/field and then masking them for a group of similar records, but this approach has drawbacks.

Described herein is an approach that de-identifies sensitive information, such as person (employee, student, etc.) identification number, name, addresses, email address, phone numbers and any other potential PII. The de-identification approach uses a mix of transformations and predefined libraries for look-up required attribute data to de-identify PII attributes with fictitious entity information including fictitious names, addresses, and the like. The result is a fully de-identified dataset from source data that looks like the original source data. The resulting data is user-friendly and suitable for demo and testing purposes as it resembles and carries the look and feel of production data, yet removes the PII of the source. By producing de-identified entity data with realistic looking names, addresses, email addresses, and other attribute data, this helps users accustom themselves to the actual look and feel of the product when/if placed into product for their specific application.

Thus, some advantages delivered by aspects described herein include:

Repeatability in the process to yield similar results—This helps in de-identifying incremental datasets (where data is updated incrementally over time) coming from a production system, which incremental source data is fed into a demo/test environments to keep it up to date, much like the real production system;

Speed—the approach can produce de-identified datasets in any desired format (such as a flat file format, like a comma-separated value (*.csv) format) in mere minutes or faster;

Distinctive datasets as compared to other techniques—Some existing techniques, for instance the masking technique, do not replace existing attribute data with new, valid attribute data (e.g. replace a phone number with a new, valid-format phone number), and instead just mask the source data to produce an unrealistic result, e.g. 123-555-XXXX for a phone number. The end user could take the 'X' characters to represent corrupted data, or at least clearly not accurate data, for instance. In contrast, aspects described herein produce de-identified data that looks like real data rather than something that has been clearly sanitized. Thus, the real feel of the source data is preserved in the de-identified dataset.

Analyzing product defects in the test environment—As explained further herein, knowing the de-identification key for a field like person ID could help in analyzing software defects in the test environment. The de-identification key refers to an obfuscation or transformation being applied. In a basic example, an employee ID field with data 'AB123' might be transformed to 'ZY987'. The key is what defines the transformation between the two, and, if known, can re-identify the entity 'ZY987' back to the person 'AB123'. This might be useful for troubleshooting, or other purposes.

Related to the preceding point, a base directory with library look-up files helps in backtracking information from the de-identified version to the real entity, e.g. real person_ID vs. de-identified person_ID, real first name vs. de-identified first name, and any the related de-identified information against that real person.

Some aspects described herein are processes that are performed on computer system(s). In some embodiments, database server(s) or other backend (i.e. rather than user-facing) servers obtain source entity data, such as data in the form of flat files, and produce output data, e.g. in the form of de-identified data as flat files. In particular embodiments, demo and/or test environment software executes on individual computer systems (test machines, clients), and back-end server(s) hold the de-identified data and perform processing that uses the data, for instance processing to serve aspects of the client software or other client-facing software. In some embodiments, source data flat files are stored in a database and retrieved by a server executing an extract, transform, load (ETL) tool, which extracts the source data, 'transforms' it to produce output files as described herein, and loads the resulting flat files to a database—either the original database or another database. An ETL process, which is an example transformation process, nominally includes three overarching steps: (i) Extract—select/extract data from the data source(s) and/or data set(s); (i) Transform—integrate data of the data sets/sources, apply controls to the data, transform the data, etc.; and (iii) Load—load the result of the transformation(s) to a target.

By way of specific example, FIG. 1 depicts an example environment to incorporate and use aspects described herein. Data integration or transformation tool/process (e.g. ETL tool/process) 102, which is implemented by one or more computer systems 101 and/or software executing thereon, extracts source data from data sets/sources 104a, 104b. The source data may be data about entities, which could include any type of entity, such as people, schools, organizations, or the like. Example data sources include relational databases (DB2, SQL, etc.), comma separated value (CSV) files, and COBOL programs, among others. Example data sets include third-party data from a third-party system, among others.

In a typical ETL tool/process, if the ETL tool/process 102 and/or target accepts a given data element, that data is loaded to the target—in this example system 106, which may be a database or a computer system managing or hosting the database, for instance. Communication 110 and 112, shown as arrows extending between components of FIG. 1, may occur over any appropriate wireless or wired communication link(s) for communicating data, which communication link(s) can encompass one or more local area network(s) and/or wide area network(s). Thus, in some embodiments, components form and/or communicate via one or more intervening networks over wired and/or wireless communications links. Alternatively, communication 110, 112) may represent communication within a single system, such as a data bus.

Further aspects presented herein are described using specific example data files and processes laid out in FIGS. 2 through 16 pertaining to people/persons and school data as the subject entities for which PII is a concern.

An example folder structure of a working directory includes an 'anonymized' folder for de-identified entity files, an 'anon_list' folder for de-identified entity lookup list9s), and an 'original' folder for the source entity data. Thus, the source files are kept in the 'original' folder, and the de-identified files are delivered/written to the 'anonymized' folder. Other related libraries, e.g. those containing name banks or other fictitious data, and any intermediate files created for processing may be stored in the 'anon_list' directory.

In the specific example described herein, which is presented by way of example and not limitation, person-related attributes come in various entity files including a 'person source file', 'person address' file, 'person email' file, 'person telephone file. These are fed into an anonymization process for outputting de-identified entity files.

As noted, the original source entity data ('entity files' as used herein) could be obtained as flat files, for instance .csv files with double-quotes, as is used in examples presented herewith. It should be understood however that the source data could be in any desired format.

FIG. 2 depicts an example entity file of source entity data, in accordance with aspects described herein. The entity file 200 of FIG. 2 is a 'person file' that includes attribute data about several people. People in this example are the 'entities'. Attribute data of a single person/entity is shown in the example of FIG. 1. The bold text represents a header that defines the entity attributes that may be included about each entity in the entity file 200. Each entity attribute is surrounded by double quotes, and the different entity attributes are separated by commas. Here, the entity attributes include person identifier ("PERSON_ID"), person type ("PERSON_TYPE") referring to, e.g. student vs. faculty, last name ("LAST_NAME"), first name ("FIRST_NAME"), among several others listed in FIG. 2.

Following the header is entity data for actual entities. The example of FIG. 2 shows data for a single entity/person. The data is data values ('entity attribute data') for one or more of the data attributes held in this file. The first record is for a person who is a student named Carlos Chase Daniel. The person_ID for Carlos is S-14914, serving as a unique identifier for that student. Carlos is a male student, and his birthdate is provided as 2002 Feb. 26. The data herein for Carlos is up-to-date as of 2018 May 28.

The source entity data includes an identifier of the entity, e.g. an entity identifier, for instance S-14914 for Carlos, that uniquely identifies Carlos, and various other entity attribute data. The attribute data is presented in respective formats ('entity attribute formats') for each of the entity attributes of that entity. For instance, birthdate is presented as a four-digit year, followed by a two-digit month and two-digit day, all separated by hyphens. Thus, entity attributes represent the attributes for a given entity, for instance the entity's name, address, email address, gender, and so on. For entity each attribute, there may be "entity attribute data" for that entity attribute, for instance "Carlos" for the entity attribute "FIRST_NAME". It is possible that there does not exist data for each and every entity attribute for a given entity, in which case double quotes enclose no data for that entity attribute, as shown in FIG. 2. Where entity attribute data is presented, it is in a given format. An email address is expected to be in a format xxx@yyy.zz, where zz represents the top-level domain, yyy represents the second-level domain, and xxx represents the identifier of the particular email recipient.

In the example of FIG. 2, the entity is a person (Carlos), the entity attributes of the person include, inter alia, name and contact information of the person. The person_ID, name, and possibly other entity attribute data may be regarded as PII. Any desired rules for distinguishing what is PII from what is not PII can be used.

An approach as described herein uses various transformations to de-identify selected fields, such as entity identifier(s) like employee number or student ID, as examples. A simple transformation technique would replace the numerical digits 0, 1, 2, . . . , 9 with the digits 9, 8, 7, . . . , 0, respectively, and replace the letters a, b, c, z with the letters z, y, x, . . . , a, respectively. Under the transformation, the resulting transformed entity identifier is not based on fictitious data and is instead a function of the original entity identifier and the transformation function. Then, for de-identification of other fields such as first name, last name, telephone number, street address, email address and others, aspects perform a look-up of fictitious information derived from one or more libraries of fictitious corresponding entity attribute data, i.e. names, addresses, and the like.

Figure 3:
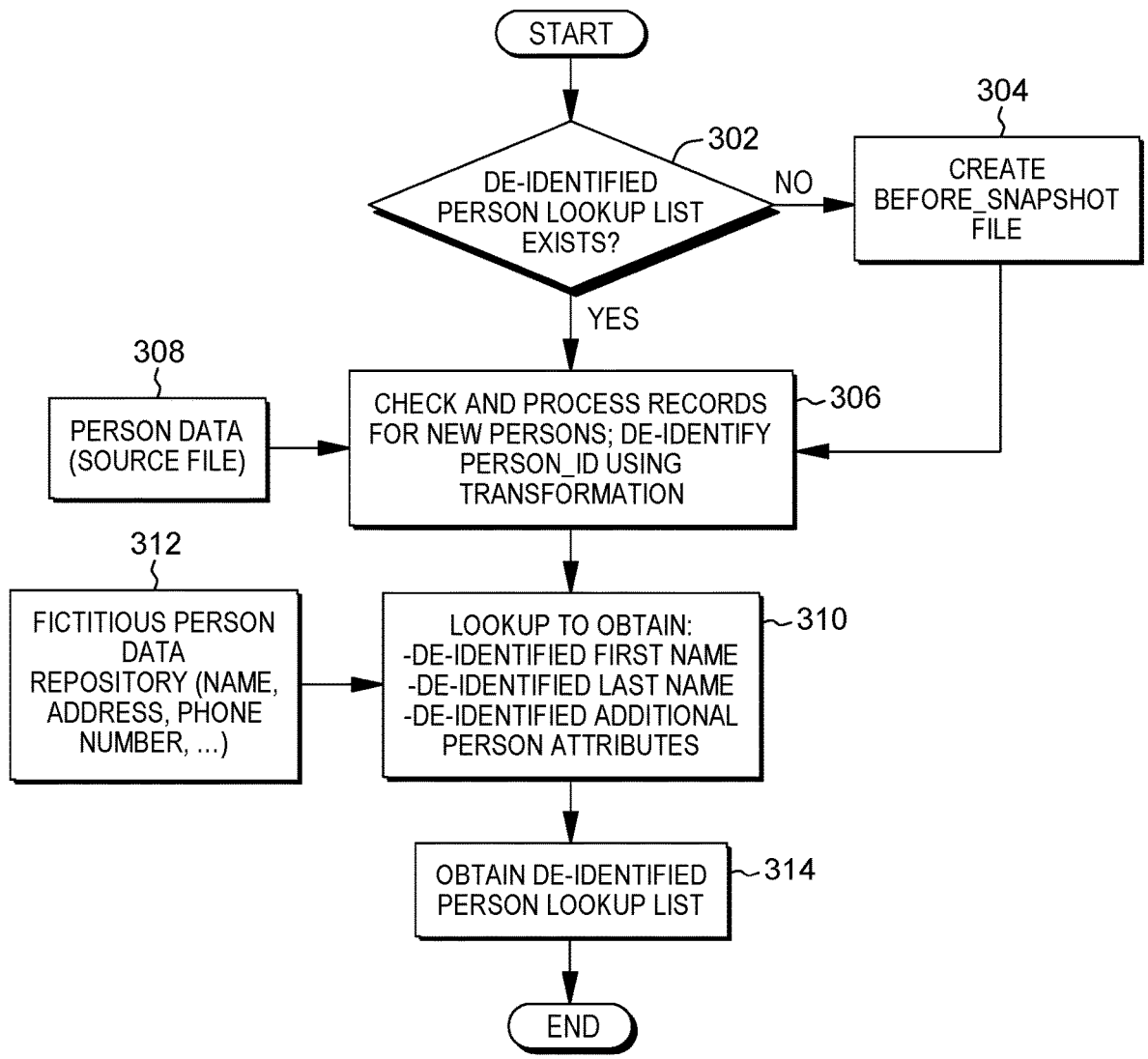
FIG. 3 depicts an example process for generating a de-identified entity lookup list, in accordance with aspects described herein.

To assist in the de-identifying of entity data, one or more de-identified entity lookup lists are provided. FIG. 3 depicts an example process for generating a de-identified entity lookup list, in accordance with aspects described herein. In some examples, the process is performed by one or more computer systems, such as an ETL system. The process of FIG. 3 utilizes a predefined library of fictitious entities, an example of which is provided by FIG. 4. The predefined library of fictitious entities includes fictitious entity attribute data and can be selected to include attribute data for entity attributes that correspond to those of the original source data. That is, if the source date includes real person data with names, addresses, phone numbers, credit card numbers, and email addresses, the fictitious data could be selected to include fictitious entity attribute data of those entity attributes. Additionally, the corresponding fictitious entity attribute data, that corresponds to the entity attributes of the source entity data, can be in the entity attribute formats of the original source data entity attributes. In other words, if source data is in the format xxx-xxx-xxxx, the fictitious data could also be defined in that format in the library, or at least converted to have that format.

It is also noted that the selection of the fields in the library/libraries could depend on the requirement of what PII fields are to be de-identified, and can be configurable depending on requirements on what attributes are needed. It may be the case that, for a particular application and set of source data, an entity attribute specifying a real person's marital status (for instance) may not be considered PII. 'Marital status' need not to be an entity attribute provided in the fictitious data in that case. Instead, the marital status of a given person may simply be carried through to the de-identified version of that person in the output data on the basis that this data will not create a risk to personally identifying that person. Fictitious or fake data, for example name banks and their related attributes, are publicly available with ease over internet where one can obtain and order the required attributes along as a number of records.

Referring specifically to the predefined library of FIG. 4, the library 400 is labeled a 'person data repository' as it contains fictitious entity attribute data for people. Again a header is presented in bold text with commas delimiting the fictitious entity attributes included for the fictitious entities. Here there are four fictitious entities shown, numbered 1 through 4. Data for various entity attributes (defined in the bold header) is presented for each entity, including gender, title, given name, middle name, surname, and so on. As noted, in some examples the fictitious entity attribute data is presented in respective formats that are the formats of the entity attributes in the source data, in order to make it easier to perform a straight substitution of fictitious entity attribute data for real entity attribute data from a source entity file.

Referring back to the process of FIG. 3 for generating a de-identified entity lookup list, the process is performed perhaps periodically or aperiodically, for instance after incremental updates of data. Therefore, the process is repeatable and suitable for initial loads followed by incremental loads. The process begins by determining (302) whether a de-identified person lookup list already exists (on the initial run, this file may not exist). If not (302, N), the process creates (304) a before snapshot file, which may be an empty lookup list ready for record additions. Then, or if it is determined at 302 that the deidentified lookup list does exist (302, Y), the process proceeds by checking and processing (306) incoming source entity records for new people, and deidentifying their person identifier using a transformation. In this regard, the incoming person data (source file(s)) (308) are input to this check. FIG. 2 is an example such file. The source data may have been updated or may not have been since the last run. This may be referred to as a delta records check. For each new entity (e.g. person in this example), they need to be de-identified and therefore added to the lookup list as described. The de-identify the person ID refers to anonymizing the person ID using a transformation to produce a transformed entity identifier for the person. Any desired transformation function could be used. Using the example of FIG. 2, when student S-14914 is first encountered in the processing of FIG. 3, the person ID S-14914 that identifies Carlos Chase Daniel is transformed into a transformed entity identifier.

At this point, the identifier of the person has been anonymized but the additional entity attribute data (name, addresses, etc.) are to be de-identified. In this regard, the process proceeds by obtaining a predefined library of fictitious entities with corresponding fictitious entity attribute data, for the entity attributes of the person data source file 308, that is in the respective formats of those entity attributes in the source file 308. In FIG. 3, the process obtains a fictitious person data repository (312) having name, address, phone number and other data, an example of which is FIG. 4 described above. It is noted that the fictitious data includes fictitious data for at least some entity attributes that were seen in the source data. In this regard, the predefined library/libraries may be selected such that the include fictitious entity attribute data of the type needed for the entity attributes observed in the source data.

The process performs a lookup (310) in the fictitious person data repository 312 to obtain appropriate fictitious entity attribute data, for instance a de-identified first name, last name, and any relevant additional entity attributes for the target entity (e.g. person "Carlos Daniel" with person ID S-14914 in the example). The fictitious entity attribute data to actually pull from the library can be a function of which data of the source data is being de-identified. Additionally, any technique desired can be used to select which specific fictitious data record to use from the library.

At that point, data can be written out to a de-identified entity lookup list to obtain (314) the de-identified entity lookup list. One aspect of the lookup list can be that it correlates the entity identifier (e.g. person ID) of the entity to a fictitious entity of the predefined library. As noted, a transformation to the entity identifier is performed to produce a transformed entity identifier. A fictitious entity is selected from the predefined library of fictitious entities. Then, to the de-identified entity lookup list is written various information, for instance the entity identifier, the transformed entity identifier, and fictitious entity attribute data that corresponds to the selected fictitious entity, the fictitious entity attribute data being data for entity attributes observed in the source data. Thus, for the given entity recognized as a new entity to add to the de-identified lookup list, the real entity ID, the transformed (de-identified) entity ID, and also various fictitious entity attribute data that is observed for the fictitious entity is written to the lookup list.

The obtained de-identified person lookup list is an output of the process of FIG. 3. To further explain, FIG. 5 depicts an example de-identified entity lookup list, in accordance with aspects described herein. The list 500 is a de-identified person lookup list, as the entities are people in this example. A header portion in bold text specifies the entity attributes that are included about each entity in the list, again surrounding each entity attribute in double quotes and separating them with commas. Below the header are the records for each entity, one or which is shown here—the lookup information for real person Carlos Daniel. The lookup list provides a correlation between a real entity and a fictitious entity, and therefore includes the entity identifier for the real person ("PERSON_ID") and the transformed entity identifier ("ANON PERSON_ID"). Here, the entity identifier S-14914 for Carlos has been transformed to A-G-96196. Additionally provided in the lookup list in this example are various entity attributes and the de-identified versions (fictitious entity attribute data from the person data repository) of those attributes. Thus, both the "FIRST_NAME" (real first name) of the entity and the de-identified first name ("ANON_FIRST_NAME") are written to the lookup list 500. It is also noted that some of Carlos Daniel's real information from the source file may be carried into the lookup list, if desired.

Since the source data might include various different types of entities for which there might be PII in the records to be de-identified, a de-identified entity lookup list can be provided for each such entity type. For instance, the source data could also include, in addition to person data for students, data about the subject schools that such students attend, where each school is an entity for which PII may be a concern. Thus, more than one lookup list might be produced.

Figure 6:
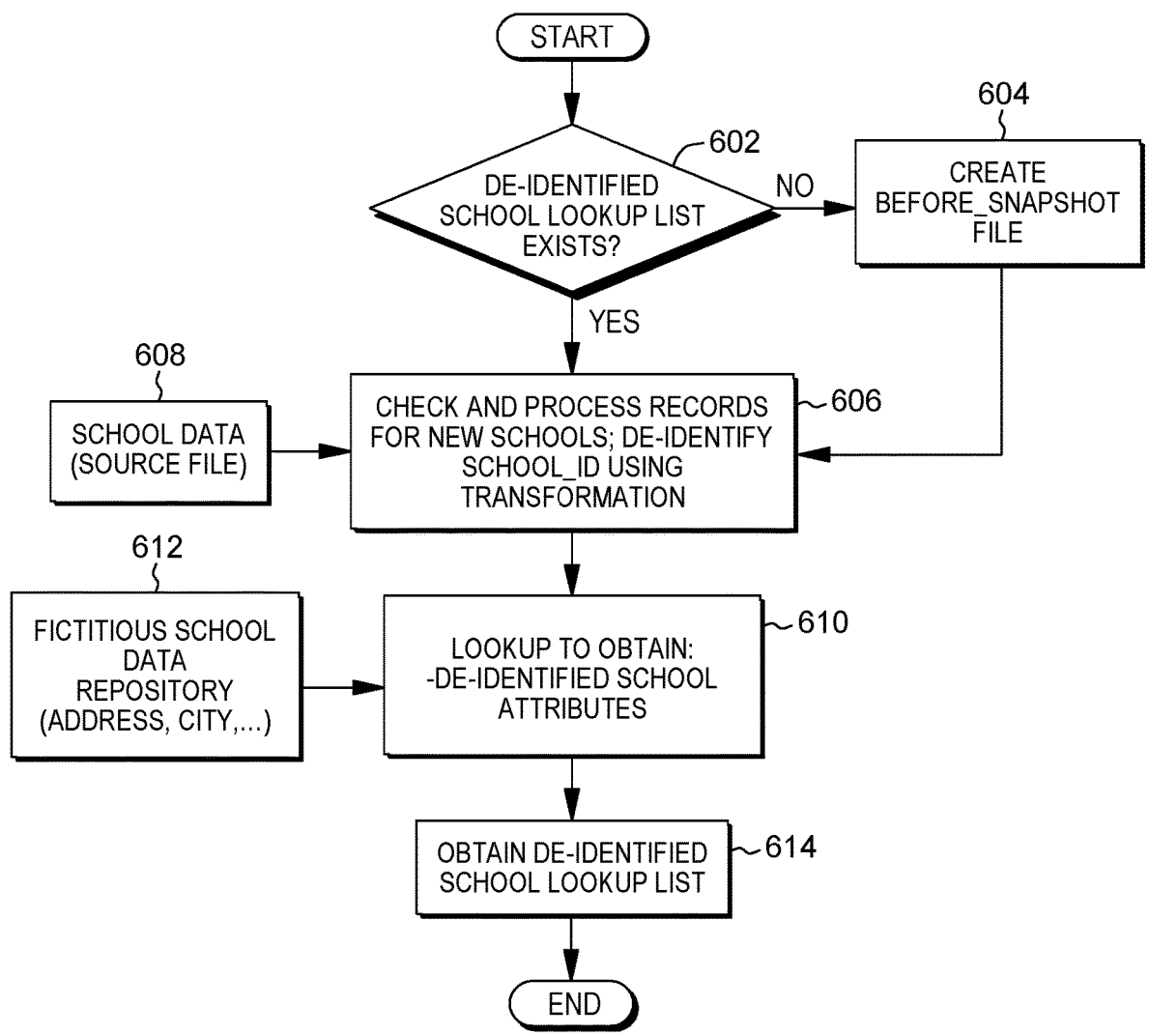
FIG. 6 depicts another example process for generating a de-identified entity lookup list, in accordance with aspects described herein.

FIG. 6 depicts another example process for generating a de-identified entity lookup list, in accordance with aspects described herein. The process mirror that of FIG. 2, except that the entities are schools and the predefined library is of fictitious school data. The process determines (602) whether a de-identified school lookup list exists, and if not (602, N) creates (604) an empty before snapshot file. Then, or otherwise (602, Y), the process checks school data (608) and processes (606) records for new school(s), and de-identifies the school identifiers using a transformation. The process uses a fictitious school data repository (612) to look up and obtain (610) de-identified school attributes. Appropriate data, for instance the school identifier, transformed school identifier, and appropriate fictitious school attribute data is written to the de-identified school lookup list to obtain (614) the de-identified school lookup list.

The generated lookup list(s) can then be used by, e.g., an ETL tool performing lookups thereto, in order to process entity files and yield de-identified versions of those source data files, terms 'de-identified entity files' herein. The de-identified entity files may be the output files with which the demo/testing software interacts. In this regard, the output de-identified entity file(s) can be provided to a software environment that uses the de-identified entity file(s) for testing and/or demonstrating the software.

Figure 7:
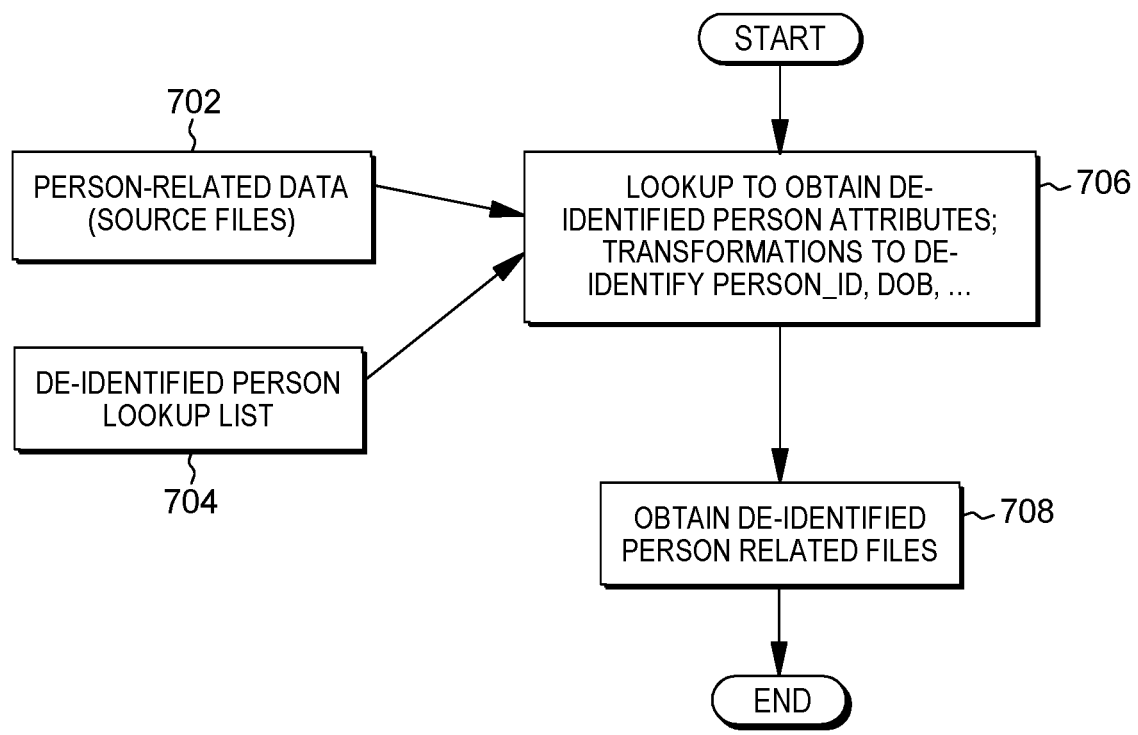
FIG. 7 depicts an example process for generating de-identified entity files, in accordance with aspects described herein.

FIG. 7 depicts an example process for generating de-identified entity files, in accordance with aspects described herein. In some examples, the process is performed by one or more computer systems, such as an ETL system. The entity type in this example is people. Generally, the processing may process one or more entity files of the source entity data. The process uses the de-identified entity lookup list (e.g. FIG. 5) to de-identify the entity referenced by a record of an entity file, and recreates the record for that entity, in an output de-identified entity file, but de-identifying appropriate attribute data from that record and instead putting in its place fictitious entity attribute data. The processing produces corresponding de-identified entity file(s) in which the entity is identified by the transformed entity identifier and in which at least some fictitious entity attribute data from the de-identified entity lookup list is used in place of entity attribute data included in the entity files.

The process of FIG. 7 begins by taking person-related data (702) (e.g. source entity files, such as person data file of FIG. 2, person address file of FIG. 9, person email file of FIG. 11, and person telephone file of FIG. 13) and the de-identified person lookup list (704), such as that of FIG. 5, and performing a look up (706) to obtain de-identified (fictitious) person attributes and transformations to de-identify the desired entity attributes, such as person ID, name, date of birth, and/or any other desired fields. For each of the entity file(s), the process uses the de-identified entity lookup list to correlate the entity identifier appearing in the entity file to the transformed entity identifier and the fictitious entity attribute data that corresponds to the selected fictitious entity. Thus, if an entity file references person ID S-14914, then the process will lookup that identifier in the lookup list (FIG. 5) and find the transformed entity identifier A-G-96196 and the rest of the entity attribute data for that entity in the lookup list. Appropriate data may then be written out to obtain (708) the de-identified entity person related file. Writing out to the de-identified entity file can write-out the transformed entity identifier and then, for each entity attribute (of that entity) for which entity attribute data is included in the particular entity file, corresponding entity attribute data. The corresponding entity attribute data could be the same data that was in the source file (e.g. if it's not considered PII) or fictitious entity attribute data from the lookup list, if the data in the source file is PII. Therefore, when creating a de-identified entity file from a source entity file, the entity attribute data to write to the de-identified entity file and that is to correspond to an entity attribute represented in the source entity file can be selected from (i) fictitious entity attribute data for the entity attribute, based on determining that the entity attribute data is personally identifiable information, and (ii) the entity attribute data as it is included in the entity file, based on determining that the entity attribute data is not personally identifiable information. In this manner, entity attributes, for an entity, observed in the source input entity file are carried into the output file, and in doing that, a selection is made between (i) using the attribute data that is included for that attribute in the source file (i.e. if it's not PII), or (ii) instead using fictitious entity attribute data for that entity attribute (i.e. if the entity attribute is a PII attribute, for instance person identifier or person name).

To illustrate the production of the de-identified entity files, refer initially for FIG. 8 depicting an example de-identified entity file corresponding to the entity file of FIG. 2, in accordance with aspects described herein. The de-identified person file includes the same entity attributes as those of FIG. 2, thus the header in bold is the same as between the two files. But in FIG. 8, various entity attribute data has been de-identified. The transformed entity identifier A-G-96196 is used as the PERSON_ID instead of the original attribute data S-14914. PERSON_TYPE remains "Student", and therefor this can be carried through from the original source file (FIG. 2) since Student is not PII in this example. The data for entity attributes LAST_NAME, FIRST_NAME, MIDDLE_NAME and BIRTHDATE are the fictitious data for those attributes that is specified in the lookup list for entity S-14914=A-G-96196. It is seen that if the source entity attribute data includes or is personally identifiable information, and the process uses de-identifying fictitious entity attribute data from the de-identified entity lookup list in place of the personally identifiable information, when writing out to the output entity file. It is also seen that the corresponding entity attribute data written to the de-identified entity file can be in a format matching that of the entity attribute data of the source entity file. As an example, alphanumeric data is replaced with alphanumeric data, to preserve a look and feel of the entity attribute data of the one or more entity files. For instance, numeral(s) may be replaced with numeral(s) and letter(s) may be replaced with letter(s).

FIGS. 9 and 10 depict another example entity file and corresponding de-identified entity file, in accordance with aspects described herein. The entity file 900 of FIG. 9 is a person address file to hold various address information about an entity. The information includes the key, i.e. the person ID, address lines one and two, city, state, country, zip code, the person type, etc. Here, since this is a source file, the entity attribute data is the real data that includes PII. FIG. 10 depicts an example de-identified entity file 1000 corresponding to the entity file of FIG. 9. The person ID and address information has been de-identified therein using at least the correlation between S-14914 and transformed identifier A-G-96196 as provided in the lookup list. Other entity attribute data, such as the data person type, address type, and is_active fields, is carried into the de-identified entity file 1000 in this example, as that is not considered PII in this example.

FIGS. 11 and 12 depict another example entity file and corresponding de-identified entity file, in accordance with aspects described herein. The entity file 1100 of FIG. 11 is a person email address file to hold email address information about an entity. The information in file 1100 includes the key, i.e. the person_ID ("PERSON_ID"), email address ("EMAIL_ADDRESS"), the person type ("PERSON_TYPE"), a binary value ("EMAIL_PRIMARY_YN") indicating whether the specific email address is the primary email address for that person, the account type ("EMAIL_TYPE") of the email address, a binary value ("IS_ACTIVE_YN") indicating whether the specific email address is active, and the most recent as-of date ("DATA_AS_OF_DATE"). File 1100 is a source entity file, and here the PII includes the person ID and email address. FIG. 12 depicts an example de-identified entity file 1200 corresponding to the entity file of FIG. 11. The person ID and email address have been de-identified therein using at least the correlation between S-14914 and transformed identifier A-G-96196 as provided in the lookup list. The fictitious email address corresponding to entity A-G-96196 in the lookup file is NicholasSSmith@superrito.com. Other entity attribute data in file 1100 but not considered PII is carried into the de-identified entity file 1200 in this example.

FIGS. 13 and 14 depict another example entity file and corresponding de-identified entity file, in accordance with aspects described herein. The entity file 1300 of FIG. 13 is a person telephone file to hold telephone information about an entity. The information in file 1300 includes the key, i.e. the person ID ("PERSON_ID"), telephone number ("TELEPHONE_NUMBER"), the person type ("PERSON_TYPE"), a timeframe ("TELEPHONE_AVAILABLE_TIME") where the person is indicated as being available at that number, a binary value ("TELEPHONE_CALL_YN") indicating whether the number can be used for telephone calls, a binary value ("TELEPHONE_TEXT_YN") indicating whether the number can be used to receive text messages, a binary value ("TELEPHONE_PRIMARY_YN") indicating whether the telephone number is the primary phone number for that person, a binary value ("IS_ACTIVE_YN") indicating whether the telephone number is active, an indicator of the type ("TELEPHONE_TYPE") of phone number, e.g. H for Home, M for cellular/mobile, W for work, etc.) and the most recent as-of date ("DATA_AS_OF_DATE"). File 1300 is a source entity file, and here the PII includes the person ID and telephone number. FIG. 14 depicts an example de-identified entity file 1400 corresponding to the entity file of FIG. 13. The person ID and phone number have been de-identified therein using at least the correlation between S-149-14 and transformed identifier A-G-96196 as provided in the lookup list. Other entity attribute data in file 1300 but not considered PII is carried into the de-identified entity file 1400 in this example.

The entity attribute data for people is provided in four entity files in the above examples but could have been provided in more of fewer files, for instance in a single file, if desired. Additionally or alternatively, a given file may correspond only to a single entity or a group of entities. The distribution of entity attribute data across any number of files may be based on any of various considerations, for instance how the source data is generated, how the particular consumer software of the data expects the data to be presented, and/or what is most efficient items of storage space and working with the data.

Figure 15:
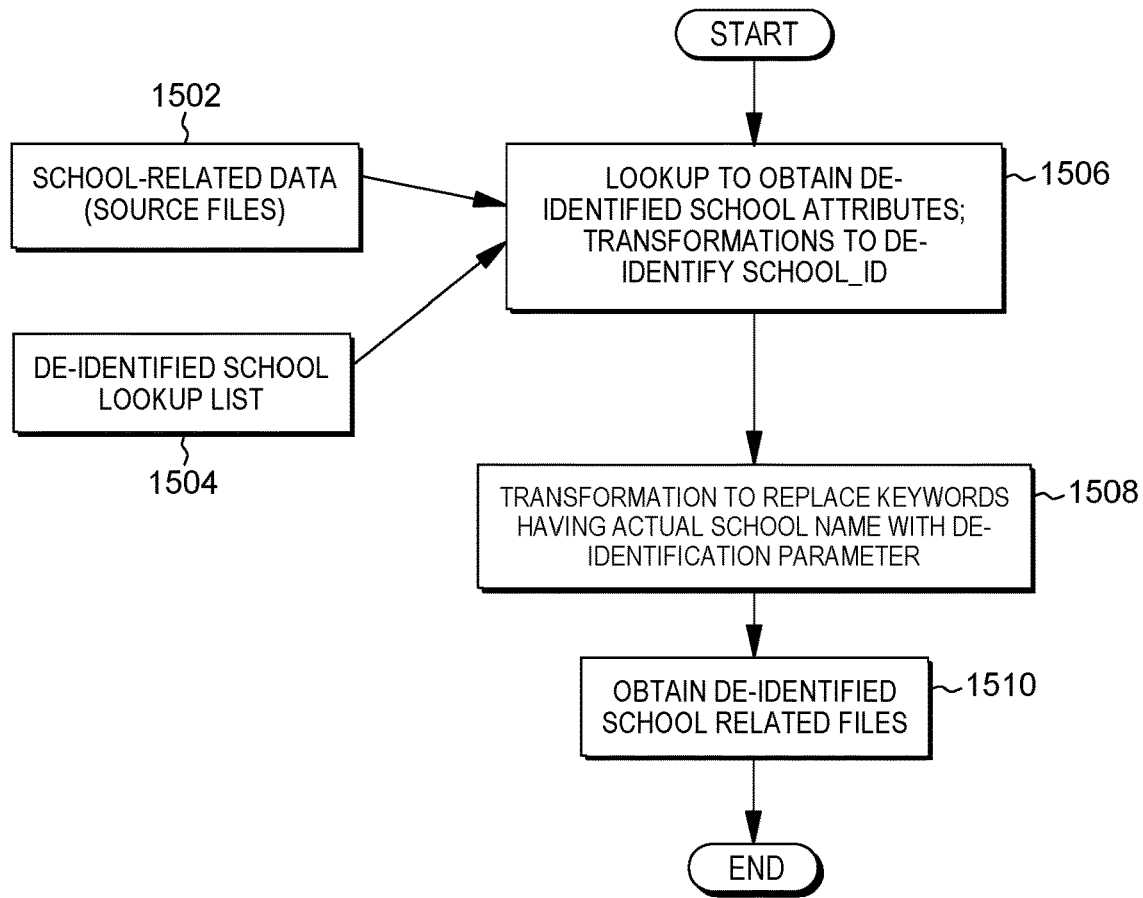
FIG. 15 depicts another example process for generating de-identified entity files, in accordance with aspects described herein.

FIG. 15 depicts another example process for generating de-identified entity files, in accordance with aspects described herein. FIG. 15 is analogous to the process of FIG. 7 except that the subject entities are schools rather than people, so the source data is school data rather than person data. The process takes school-related data 1502 as the source data and a de-identified school lookup list 1504 that correlates school identifiers to transformed school identifiers and corresponding fictitious entity attribute data, and performs a look up (1506) in the lookup list to obtain de-identified school attribute data and transformations to de-identify the entities by entity identifier (school identifier). The process also performs any desired transformations (1508) to replace keyword instances, in selected source data, for instance in the actual school name, with a de-identification parameter. In this regard, the lookup list for schools was created (see e.g. FIG. 6 #612) using addresses, city, etc. but, in that example, without using fictitious school names. For instance, fictitious school name data may not have existed in the fictitious school data repository. In any case, transformation(s) can be applied to deidentify school attribute(s), such as school name. To generate the fictitious school names, any desired transformations, deletions and/or augmentations to the school name may be performed, for instance to add and/or delete keyword(s). "Lovejoy Elementary School" may be transformed to "Christopher Lovejoy Elementary School" by adding the word "Christopher" and then transformed further to "Christopher Elementary School" by deleting the word "Lovejoy". Continuing with the process of FIG. 15, the collection of results are written-out to obtain (1510) de-identified school files.

Figure 16:
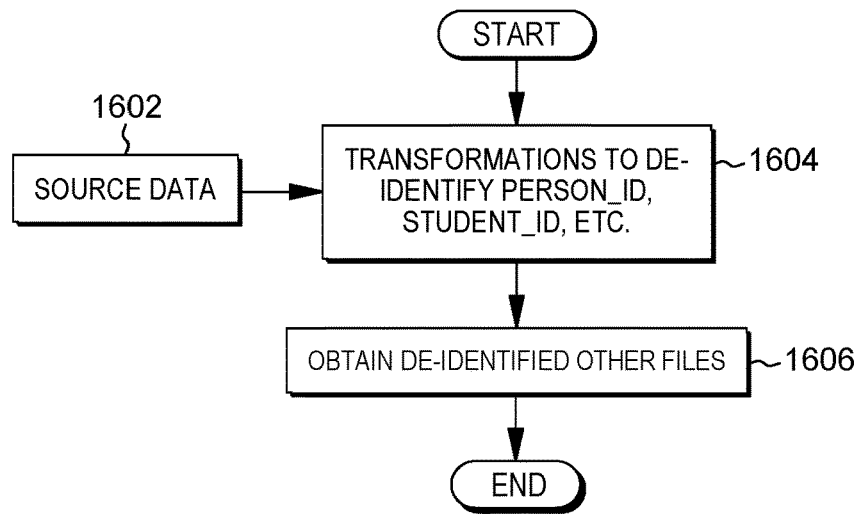
FIG. 16 depicts an example process for generating additional de-identified entity files, in accordance with aspects described herein.

There may be additional source data files with other information for de-identifying certain PII therein. In an example of school source data, grade files might contain grades for a list of students organized by student ID. FIG. 16 depicts an example process for generating additional de-identified entity files, in accordance with aspects described herein. In some examples, the process is performed by one or more computer systems, such as an ETL system. The process takes such source data entity file(s) (1602) and applies (1604) transformations to de-identify the proper entity identifier(s). In the example above, the entity identifiers are a person ID (or student ID), and a school ID. In the example of a grade file listing student grades by student ID, the output grade file may be a copy of the input grade file except that the student IDs have the transformation applied thereto (e.g. S-14914->A-G-96196). It is not necessary in this example to use any fictitious data, and the grades can be written out to the output as-is since that is, in this example, not PII. The process then obtains (1606) the de-identified other file(s) as the output.

The source data/entity files and the output de-identified entity files discussed herein can all be in ETL-ready format(s), loadable by ETL jobs into an appropriate target software environment, for instance a training, demonstration, or test environment and/or database(s) used/accessed thereby.

As an enhancement, aspects allow for re-identifying a person by reversing the de-identified data to obtain the real entity data. This may be useful for debugging or troubleshooting purposes when working with the demo or testing software that uses the de-identified data. For instance, it could help troubleshoot problems with a specific anonymized record by tracing it back to the real record and analyzing the source data.

For instance the data of a subject de-identified entity may need to be correlated to a real entity of the source data. In one example, based on identifying an error in the software's handling of entity information, of a subject entity, included the de-identified entity files, a process identifies the subject entity by applying a reverse transformation to the transformed entity identifier of the subject entity to obtain an entity identifier for the subject entity. That entity identified should correspond to that of an entity of the source entity data. The process finds, in the source entity data, the obtained entity identifier for the subject entity, and also finds entity attribute data for entity attributes of that subject entity. Using an example from above, the real entity is identified by entity identifier S-19414. During de-identification, a transformation is applied to this data to obtain transformed entity identifier A-G-96196. If problems are experienced with the de-identified data for entity A-G-96196 (the "subject entity"), the inverse of the transformation is applied to A-G-96196. Since it is the inverse of the original transformation, the result of applying the inverse is S-19414. That entity identifier can be used to look up, e.g. in the source files, entity attribute data for that entity.

In another example, a different approach is used where the inverse of the transformation may not be known. This may be done for security reasons. In this approach, again based on identifying an error in the software's handling of entity information, of a subject entity, included the de-identified entity files, a process identifies the subject entity by performing a lookup of a transformed entity identifier of the subject entity in the de-identified entity lookup list and finds the entity identifier for the subject entity. That is, the transformed entity identifier is looked up in the lookup list to find the source entity identifier (see FIG. 5 where they are correlated in the first people record therein). Not only the source entity identifier but other entity attribute data is available in that lookup list in that example, for instance the real and de-identified name of the person, address, and so on.

Thus, the process can find, in the de-identified entity lookup list, entity attribute data for entity attributes of that subject entity. Additionally or alternatively, the process could perform a lookup of the found entity identifier (e.g. S-14914) in the entity file(s) of the source data to find entity attribute data for entity attributes of that subject entity. In that situation, the entity attribute data is pulled from the original source files rather than the lookup list file. This may be followed in cases where the lookup list does not contain the desired entity attribute data, therefore requiring the process to index into original source entity file(s) using the found entity identifier (found in the lookup list using the transformed entity identifier) in order to retrieve the desired entity attribute data.

It is seen that aspects described herein use a mix of data transformations and fictitious data to produce de-identified entity data datasets from source data. The output is user friendly and suitable for demonstration and testing software purposes, as it can resemble the look and feel of the original source data, which may be actual production data in some instances. Having true-to-form distinct names, addresses, email addresses, and other entity information enables users to visualize how the end product is expected to look. This differs from other approaches, for instance ones that generate a test dataset from original dataset via a dataset perturbation process. Under these other approaches, the original dataset is used (there is no used of external library with fictitious entity attribute data), where the original data items are perturbed. In contrast, using external library/libraries completely anonymizes any potential PII field data.

Aspects also differ from approaches that generate a test work load at a database level based on non-confidential metadata by running a series of database statements/queries to scramble original data. This is distinct from using transformation logic and lookups of fictitious information to generate anonymized datasets. Moreover, such other approaches deal with data at a database level rather than a file level, so running such a set of complex statements on a relatively large dataset could be resource-intensive, resulting in significant performance bottlenecks. In addition, these approaches do not necessarily preserve a look and feel of the source data—original first name data "Catherine" may be scrambled to "eerahcnti" which is likely unrecognizable as any realistic first name of a person, thus potentially confusing users. The same applied to data distortion techniques that distort original data into something complete unrecognizable, beyond simply de-identifying the PII.

Figure 17A:
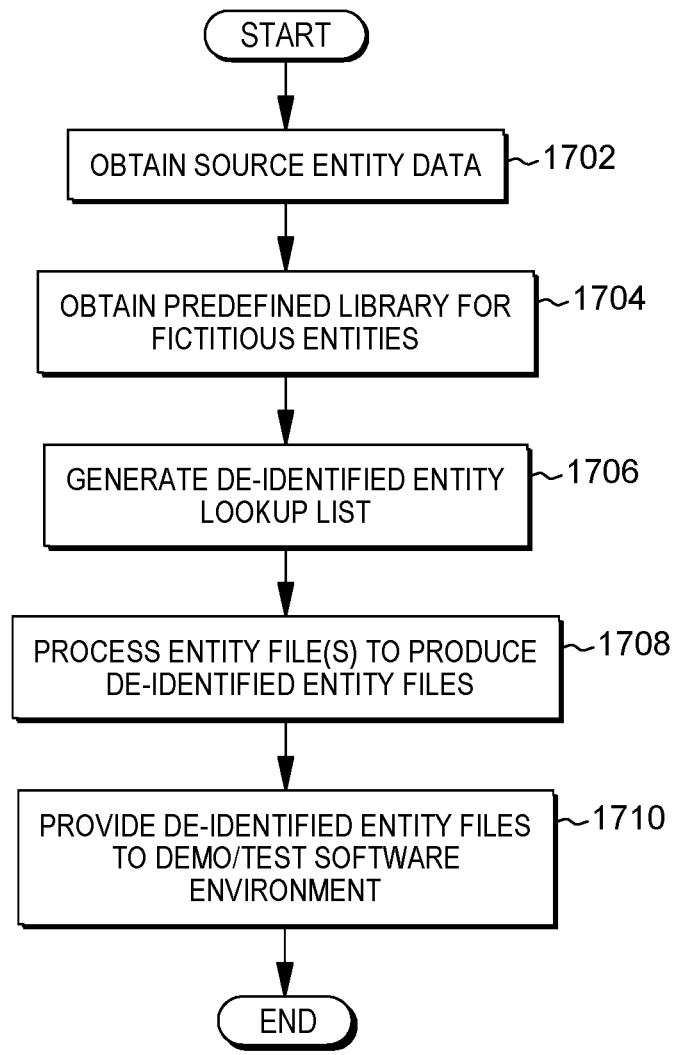
FIG. 17A depicts an example process for de-identifying source entity data, in accordance with aspects described herein.

FIG. 17A depicts an example process for de-identifying source entity data, in accordance with aspects described herein. In some examples, the process is performed by one or more computer systems, such as those described herein, which may include one or more computer systems of or implementing an ETL system or tool and/or one or more other computer systems. The process of FIG. 17A obtains (1702) source entity data, which includes at least (i) an entity identifier that uniquely identifies an entity and (ii) entity attribute data, which is in respective entity attribute formats, for entity attributes of that entity. In an example, the entity attribute data includes personally identifiable information. Entities could be of any entity type. One example is a person, and the entity attributes of the person include name and contact information of the person. Another example entity is a school. Others are possible.

The process continues by obtaining (1704) a predefined library of fictitious entities. The library includes fictitious entity attribute data, including corresponding fictitious entity attribute data for the entity attributes (of the entity from the source file). The fictitious entity attribute data can be in the respective entity attribute formats of the entity attribute data of the source file. For instance, the source entity data might include an ID, a name, and a phone number for an entity. The library might include corresponding fictitious attribute data (name, phone numbers) for fictitious entities and for at least some of the entity attributes of the source entity data, in this case the name and phone number attributes. The fictitious entity attribute data could be in the same format as the source entity attribute data, for instance the fictitious phone number could be in the format xxx-xx-xxxx.

The process generates (1706) a de-identified entity lookup list that correlates the entity identifier of the entity to a fictitious entity of the predefined library, for instance one selected from the library to provide the fictitious entity attribute data for de-identifying the entity. As part of this generating, the process applies a transformation to the entity identifier to produce a transformed entity identifier, selects a fictitious entity from the predefined library of fictitious entities, and then writes to the de-identified entity lookup list various information. This information includes the entity identifier (of the source data), the transformed entity identifier, and the fictitious entity attribute data, for the entity attributes, that corresponds to the selected fictitious entity. 1706 provides a lookup list that can be used in processing entity files making up the source entity data.

Thus, the process continues by processing (1708) one or more entity files of the source entity data using the de-identified entity lookup list to de-identify the entity. The processing the entity file(s) produces one or more corresponding de-identified entity files in which the entity is identified by the transformed entity identifier and in which at least some fictitious entity attribute data from the de-identified entity lookup list is used in place of entity attribute data included in the one or more entity files. Thus, the output could be a single or multiple files. In this processing, de-identifying fictitious entity attribute data from the de-identified entity lookup list may be used in place of the personally identifiable information. The corresponding entity attribute data written to the one or more de-identified entity files may be in a format matching the entity attribute data of the one or more entity files. Thus, for instance, alphanumeric data (of the source data) may be replaced with fictitious alphanumeric data, to preserve a look and feel of the entity attribute data of the one or more entity files.

The process then proceeds by providing (1710) the one or more de-identified entity files to a software environment, which instance one that can use the one or more de-identified entity files for testing, training, and/or demonstrating the software.

Figure 17B:
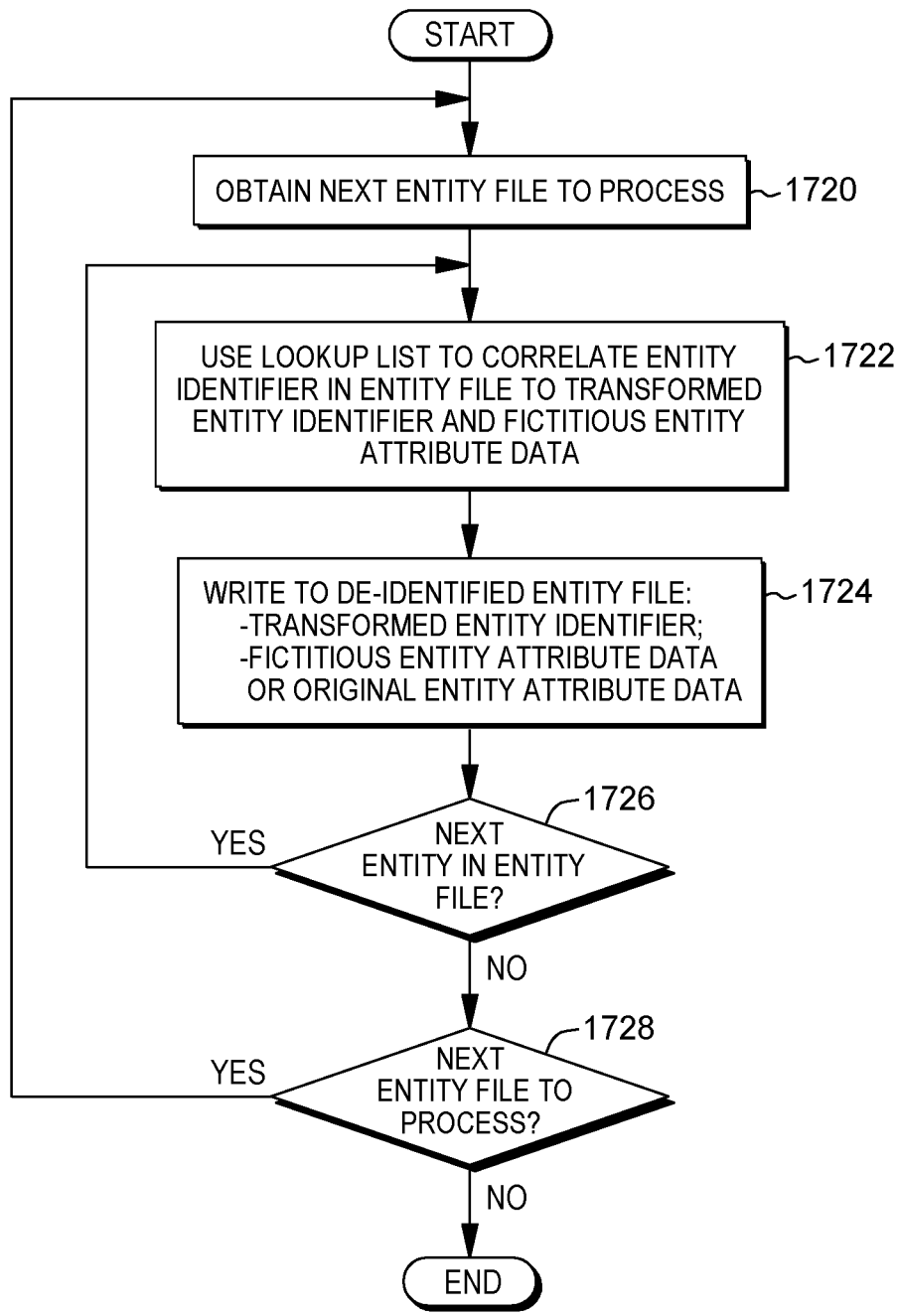
FIG. 17B depict an example process for processing entity files to produce de-identified entity files, in accordance with aspects described herein.

FIG. 17B depicts an example process for processing entity files to produce de-identified entity files, in accordance with aspects described herein. In some examples, the process is performed by one or more computer systems, such as those described herein, which may include one or more computer systems of or implementing an ETL system or tool and/or one or more other computer systems. The process of FIG. 17B is an example implementation of the processing 1708 of FIG. 17A. The process obtains (1720) a next entity file to process. There may be one or more entity files to process. The process then, for an entity in that entity file, uses (1722) the de-identified entity lookup list to correlate the entity identifier appearing in the entity file to the transformed entity identifier and the fictitious entity attribute data that corresponds to the selected fictitious entity. The process then writes out (1724) to a to-be-output de-identified entity file: the transformed entity identifier, and for each entity attribute, of that entity, for which entity attribute data is included in the entity file, corresponding entity attribute data. The corresponding entity attribute data could be, for instance, fictitious entity attribute data for the entity attribute, based on determining that the entity attribute data is personally identifiable information. Additionally or alternatively, the corresponding entity attribute data could be the entity attribute data as it is included in the (source) entity file, based on determining that the entity attribute data is not personally identifiable information. In this manner, not all original source data about an entity is necessarily de-identified.

The process of FIG. 17B proceeds by determining (1726) whether there is a next entity to process in the entity file. If so (1706, Y), the process returns to 1722 to repeat 1722 and 1724 with data for that next entity, otherwise (1722, N), the process proceeds to determine (1728) whether there is a next entity file to process. If so (1728, Y), the process returns to 1720 to obtain that next entity file and repeat the process, otherwise (1728, N), the process ends.

Figure 17C:
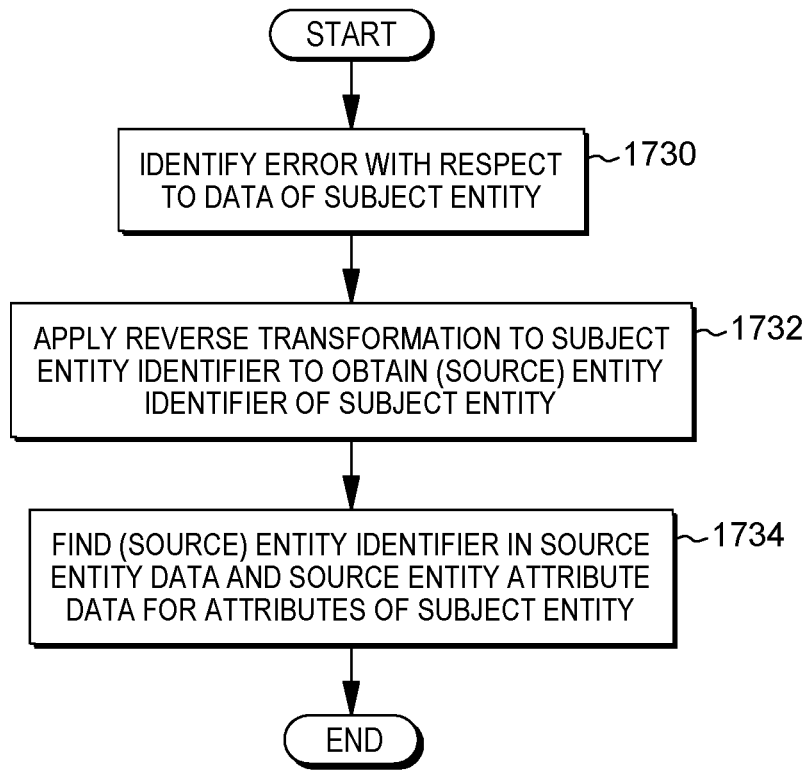
FIGS. 17C-17D depict example processes for identifying an entity based on de-identified entity data, in accordance with aspects descried herein.
Figure 17D:
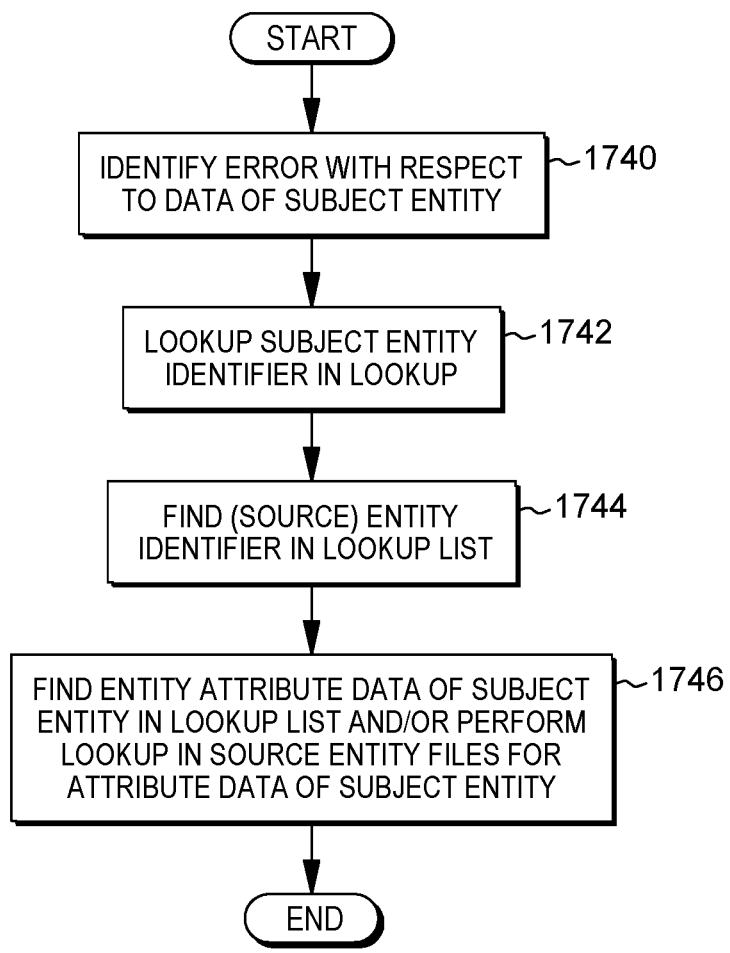

FIGS. 17C-17D depict example processes for identifying an entity based on de-identified entity data, in accordance with aspects descried herein. In these examples, a de-identified entity is being identified (or re-identified). In some examples, the processes of FIGS. 17C-17D are performed by one or more computer systems, such as those described herein, which may include one or more computer systems of or implementing an ETL system or tool and/or one or more other computer systems.

Referring to FIG. 17C, the process identifies (1730) an error with respect handling of entity information, of a subject entity, included the de-identified entity files, by software, for instance a test environment. The process then identifies (1732) the subject entity by applying a reverse transformation to a transformed entity identifier of the subject entity to obtain an entity identifier for the subject entity. The reverse transformation is, e.g. a reverse of the transformation that was used to transform the entity identifier into the transformed entity identifier that is seen in the de-identified entity data being used in the testing environment. The process, using the obtained entity identifier based on the reverse transformation, finds (1734) in the source entity data the obtained entity identifier for the subject entity and also entity attribute data for entity attributes of that subject entity.

FIG. 17D presents another possibility for identifying a de-identified entity and obtaining attribute data thereof. In FIG. 17D, the process again identifies (1740) an error with respect handling of entity information, of a subject entity, included the de-identified entity files, by software, for instance a test environment. Based on identifying the error, the process identifies the subject entity by performing (1742) a lookup of the transformed entity identifier of the subject entity in the de-identified entity lookup list and finds (1744) the corresponding entity identifier for the subject entity in the lookup list. At that point, the entity identifier of the entity is known. The process then performs (1746) (i) a find, in the de-identified entity lookup list, of entity attribute data for entity attributes of that subject entity and/or (ii) lookup of the found entity identifier in the one or more entity files of the source data to find entity attribute data for entity attributes of that subject entity.

Although various examples are provided, variations are possible without departing from a spirit of the claimed aspects.

Figure 18:
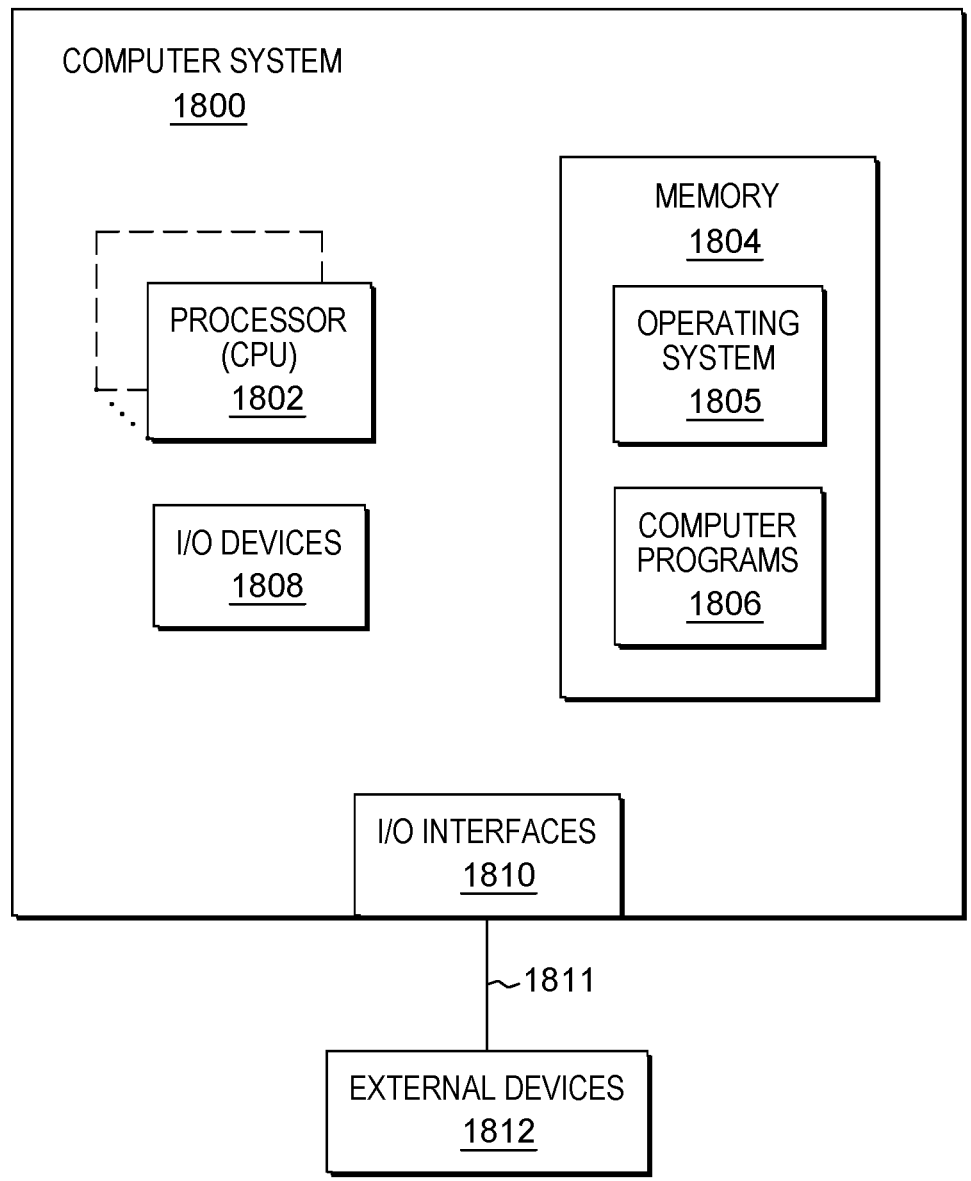
FIG. 18 depicts one example of a computer system and associated devices to incorporate and/or use aspects described herein.

Processes described herein may be performed singly or collectively by one or more computer systems, such as one or more servers of an ETL tool. FIG. 18 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 18 shows a computer system 1800 in communication with external device(s) 1812. Computer system 1800 includes one or more processor(s) 1802, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1802 can also include register(s) to be used by one or more of the functional components. Computer system 1800 also includes memory 1804, input/output (I/O) devices 1808, and I/O interfaces 1810, which may be coupled to processor(s) 1802 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1804 can be or include main or system memory (e.g. Random Access Memory) used in the execution of program instructions, storage device(s) such as hard drive(s), flash media, or optical media as examples, and/or cache memory, as examples. Memory 1804 can include, for instance, a cache, such as a shared cache, which may be coupled to local caches (examples include L1 cache, L2 cache, etc.) of processor(s) 1802. Additionally, memory 1804 may be or include at least one computer program product having a set (e.g., at least one) of program modules, instructions, code or the like that is/are configured to carry out functions of embodiments described herein when executed by one or more processors.

Memory 1804 can store an operating system 1805 and other computer programs 1806, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 1812 via one or more I/O interfaces 1810. Example external devices include a keyboard, a pointing device, a display, and/or any other devices that enable a user to interact with computer system 1800. Other example external devices include any device that enables computer system 1800 to communicate with one or more other computing systems or peripheral devices such as a printer. A network interface/adapter is an example I/O interface that enables computer system 1800 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 1810 and external devices 1812 can occur across wired and/or wireless communications link(s) 1811, such as Ethernet-based wired or wireless connections. Example wireless connections include cellular, Wi-Fi, Bluetooth®, proximity-based, near-field, or other types of wireless connections. More generally, communications link(s) 1811 may be any appropriate wireless and/or wired communication link(s) for communicating data.

Particular external device(s) 1812 may include one or more data storage devices, which may store one or more programs, one or more computer readable program instructions, and/or data, etc. Computer system 1800 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1800 may be operational with numerous other general purpose or special purpose computing system environments or configurations. Computer system 1800 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 19:
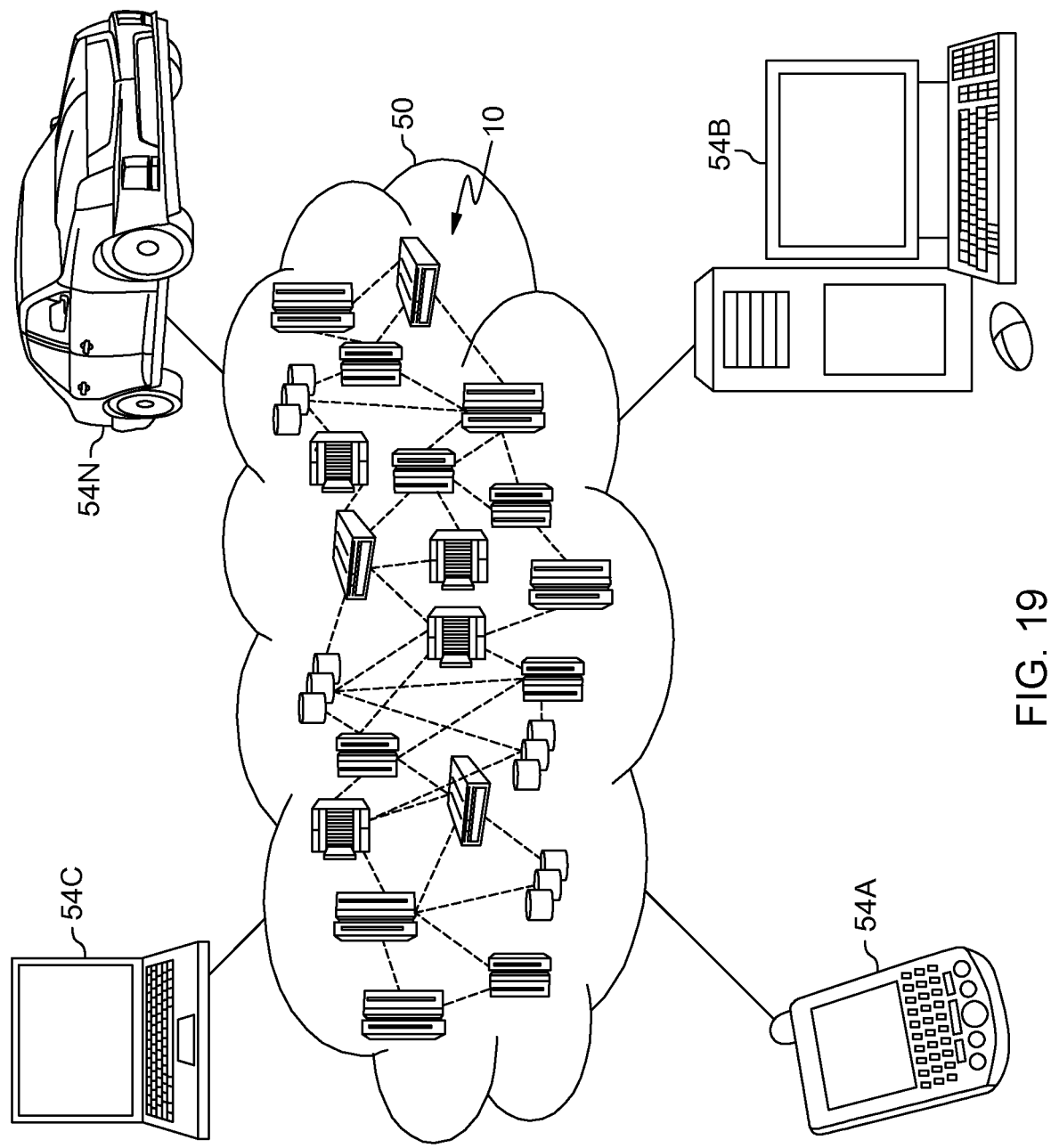
FIG. 19 depicts a cloud computing environment according to an embodiment of the present invention.

Referring now to FIG. 19, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 19 are intended to be illustrative only and that computing nodes 10 and cloud computing environment 50 can communicate with any type of computerized device over any type of network and/or network addressable connection (e.g., using a web browser).

Figure 20:
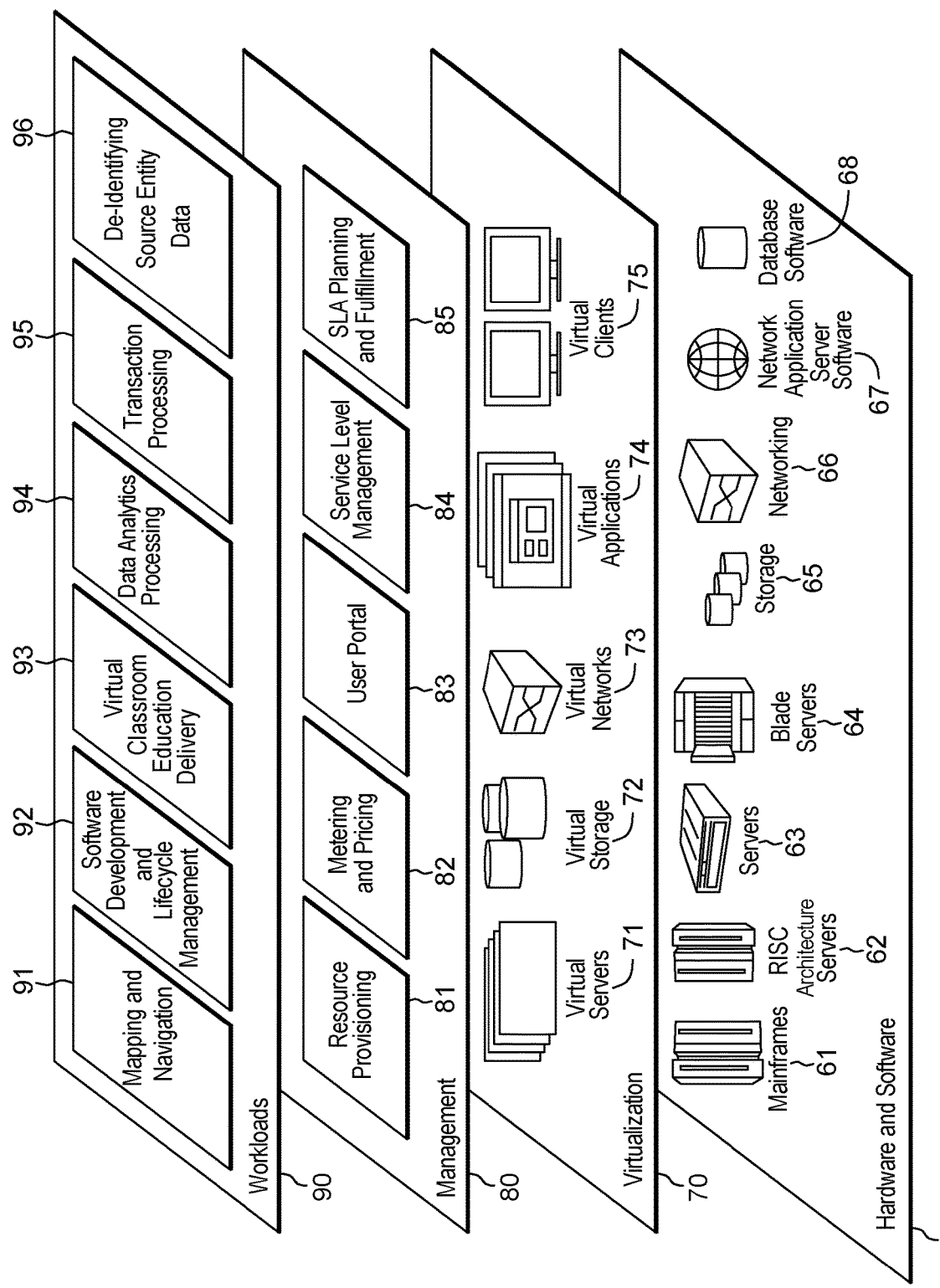
FIG. 20 depicts abstraction model layers according to an embodiment of the present invention.

Referring now to FIG. 20, a set of functional abstraction layers provided by cloud computing environment 50 (FIG. 19) is shown. It should be understood in advance that the components, layers, and functions shown in FIG. 20 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and de-identifying source entity data 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   obtaining source entity data that comprises an entity identifier that uniquely identifies an entity and entity attribute data in respective entity attribute formats for entity attributes of that entity;
   obtaining a predefined library of fictitious entities with corresponding fictitious entity attribute data, for the entity attributes, that is in the respective entity attribute formats;
   generating a de-identified entity lookup list correlating the entity identifier of the entity to a fictitious entity of the predefined library, the generating comprising:
      applying a transformation to the entity identifier to produce a transformed entity identifier;
      selecting a fictitious entity from the predefined library of fictitious entities; and
      writing to the de-identified entity lookup list the entity identifier, the transformed entity identifier, and the fictitious entity attribute data, for the entity attributes, that corresponds to the selected fictitious entity; and
   processing one or more entity files of the source entity data using the de-identified entity lookup list to de-identify the entity, the processing producing one or more corresponding de-identified entity files in which the entity is identified by the transformed entity identifier and in which at least some fictitious entity attribute data from the de-identified entity lookup list is used in place of entity attribute data included in the one or more entity files.

2. The method of claim 1, wherein the entity attribute data comprises personally identifiable information, and wherein the processing uses de-identifying fictitious entity attribute data from the de-identified entity lookup list in place of the personally identifiable information.

3. The method of claim 1, wherein the processing comprises, for each entity file of the one or more entity files:
   using the de-identified entity lookup list to correlate the entity identifier appearing in the entity file to the transformed entity identifier and the fictitious entity attribute data that corresponds to the selected fictitious entity; and
   writing out to a de-identified entity file:
      the transformed entity identifier; and
      for each entity attribute, of that entity, for which entity attribute data is included in the entity file, corresponding entity attribute data selected from the group consisting of: (i) fictitious entity attribute data for the entity attribute, based on determining that the entity attribute data is personally identifiable information, and (ii) the entity attribute data as it is included in the entity file, based on determining that the entity attribute data is not personally identifiable information.

4. The method of claim 1, wherein the corresponding entity attribute data written to the one or more de-identified entity files is in a format matching the entity attribute data of the one or more entity files, in which alphanumeric data is replaced with alphanumeric data, to preserve a look and feel of the entity attribute data of the one or more entity files.

5. The method of claim 1, further comprising providing the one or more de-identified entity files to a software environment that uses the one or more de-identified entity files for at least one selected from the group consisting of (i) testing; and (ii) demonstrating software.

6. The method of claim 5, further comprising, based on identifying an error in the software's handling of entity information, of a subject entity, included in the de-identified entity files, identifying the subject entity by applying a reverse transformation to a transformed entity identifier of the subject entity to obtain an entity identifier for the subject entity, and finding in the source entity data the obtained entity identifier for the subject entity and entity attribute data for entity attributes of that subject entity.

7. The method of claim 5, further comprising, based on identifying an error in the software's handling of entity information, of a subject entity, included in the de-identified entity files, identifying the subject entity by performing a lookup of a transformed entity identifier of the subject entity in the de-identified entity lookup list and finding the entity identifier for the subject entity.

8. The method of claim 7, further comprising at least one selected from the group consisting of:
finding, in the de-identified entity lookup list, entity attribute data for entity attributes of that subject entity; and
performing a lookup of the found entity identifier in the one or more entity files of the source data to find entity attribute data for entity attributes of that subject entity.

9. The method of claim 1, further comprising identifying a subject entity included in a de-identified entity file of the one or more de-identified entity files by obtaining, from the de-identified entity file, a transformed entity identifier of the subject entity and performing a lookup of the transformed entity identified of the subject entity in the de-identified entity lookup list and finding the entity identifier for the subject entity.

10. A computer system comprising:
a memory; and
a processor in communication with the memory, wherein the computer system is configured to perform a method comprising:
obtaining source entity data that comprises an entity identifier that uniquely identifies an entity and entity attribute data in respective entity attribute formats for entity attributes of that entity;
obtaining a predefined library of fictitious entities with corresponding fictitious entity attribute data, for the entity attributes, that is in the respective entity attribute formats;
generating a de-identified entity lookup list correlating the entity identifier of the entity to a fictitious entity of the predefined library, the generating comprising:
applying a transformation to the entity identifier to produce a transformed entity identifier;
selecting a fictitious entity from the predefined library of fictitious entities; and
writing to the de-identified entity lookup list the entity identifier, the transformed entity identifier, and the fictitious entity attribute data, for the entity attributes, that corresponds to the selected fictitious entity; and
processing one or more entity files of the source entity data using the de-identified entity lookup list to de-identify the entity, the processing producing one or more corresponding de-identified entity files in which the entity is identified by the transformed entity identifier and in which at least some fictitious entity attribute data from the de-identified entity lookup list is used in place of entity attribute data included in the one or more entity files.

11. The computer system of claim 10, wherein the entity attribute data comprises personally identifiable information, and wherein the processing uses de-identifying fictitious entity attribute data from the de-identified entity lookup list in place of the personally identifiable information.

12. The computer system of claim 10, wherein the processing comprises, for each entity file of the one or more entity files:
using the de-identified entity lookup list to correlate the entity identifier appearing in the entity file to the transformed entity identifier and the fictitious entity attribute data that corresponds to the selected fictitious entity; and
writing out to a de-identified entity file:
the transformed entity identifier; and
for each entity attribute, of that entity, for which entity attribute data is included in the entity file, corresponding entity attribute data selected from the group consisting of: (i) fictitious entity attribute data for the entity attribute, based on determining that the entity attribute data is personally identifiable information, and (ii) the entity attribute data as it is included in the entity file, based on determining that the entity attribute data is not personally identifiable information.

13. The computer system of claim 10, wherein the corresponding entity attribute data written to the one or more de-identified entity files is in a format matching the entity attribute data of the one or more entity files, in which alphanumeric data is replaced with alphanumeric data, to preserve a look and feel of the entity attribute data of the one or more entity files.

14. The computer system of claim 10, wherein the method further comprises:
providing the one or more de-identified entity files to a software environment that uses the one or more de-identified entity files for at least one selected from the group consisting of (i) testing and (ii) demonstrating software; and
based on identifying an error in the software's handling of entity information, of a subject entity, included in the de-identified entity files, identifying the subject entity by applying a reverse transformation to a transformed entity identifier of the subject entity to obtain an entity identifier for the subject entity, and finding in the source entity data the obtained entity identifier for the subject entity and entity attribute data for entity attributes of that subject entity.

15. The computer system of claim 10, wherein the method further comprises:
providing the one or more de-identified entity files to a software environment that uses the one or more de-identified entity files for at least one selected from the group consisting of (i) testing and (ii) demonstrating software; and
based on identifying an error in the software's handling of entity information, of a subject entity, included in the de-identified entity files, identifying the subject entity by performing a lookup of a transformed entity identifier of the subject entity in the de-identified entity lookup list and finding the entity identifier for the subject entity; and performing at least one selected from the group consisting of:
- finding, in the de-identified entity lookup list, entity attribute data for entity attributes of that subject entity; and
- performing a lookup of the found entity identifier in the one or more entity files of the source data to find entity attribute data for entity attributes of that subject entity.

16. A computer program product comprising:
a computer readable storage medium readable by a processing circuit and storing instructions for execution by the processing circuit for performing a method comprising:
- obtaining source entity data that comprises an entity identifier that uniquely identifies an entity and entity attribute data in respective entity attribute formats for entity attributes of that entity;
- obtaining a predefined library of fictitious entities with corresponding fictitious entity attribute data, for the entity attributes, that is in the respective entity attribute formats;
- generating a de-identified entity lookup list correlating the entity identifier of the entity to a fictitious entity of the predefined library, the generating comprising:
  - applying a transformation to the entity identifier to produce a transformed entity identifier;
  - selecting a fictitious entity from the predefined library of fictitious entities; and
  - writing to the de-identified entity lookup list the entity identifier, the transformed entity identifier, and the fictitious entity attribute data, for the entity attributes, that corresponds to the selected fictitious entity; and
- processing one or more entity files of the source entity data using the de-identified entity lookup list to de-identify the entity, the processing producing one or more corresponding de-identified entity files in which the entity is identified by the transformed entity identifier and in which at least some fictitious entity attribute data from the de-identified entity lookup list is used in place of entity attribute data included in the one or more entity files.

17. The computer program product of claim 16, wherein the entity attribute data comprises personally identifiable information, and wherein the processing uses de-identifying fictitious entity attribute data from the de-identified entity lookup list in place of the personally identifiable information.

18. The computer program product of claim 16, wherein the processing comprises, for each entity file of the one or more entity files:
- using the de-identified entity lookup list to correlate the entity identifier appearing in the entity file to the transformed entity identifier and the fictitious entity attribute data that corresponds to the selected fictitious entity; and
- writing out to a de-identified entity file:
  - the transformed entity identifier; and
  - for each entity attribute, of that entity, for which entity attribute data is included in the entity file, corresponding entity attribute data selected from the group consisting of: (i) fictitious entity attribute data for the entity attribute, based on determining that the entity attribute data is personally identifiable information, and (ii) the entity attribute data as it is included in the entity file, based on determining that the entity attribute data is not personally identifiable information.

19. The computer program product of claim 16, wherein the method further comprises:
- providing the one or more de-identified entity files to a software environment that uses the one or more de-identified entity files for at least one selected from the group consisting of (i) testing and (ii) demonstrating software; and
- based on identifying an error in the software's handling of entity information, of a subject entity, included in the de-identified entity files, identifying the subject entity by applying a reverse transformation to a transformed entity identifier of the subject entity to obtain an entity identifier for the subject entity, and finding in the source entity data the obtained entity identifier for the subject entity and entity attribute data for entity attributes of that subject entity.

20. The computer program product of claim 16, wherein the method further comprises:
- providing the one or more de-identified entity files to a software environment that uses the one or more de-identified entity files for at least one selected from the group consisting of (i) testing- and (ii) demonstrating software;
- based on identifying an error in the software's handling of entity information, of a subject entity, included in the de-identified entity files, identifying the subject entity by performing a lookup of a transformed entity identifier of the subject entity in the de-identified entity lookup list and finding the entity identifier for the subject entity; and
- performing at least one selected from the group consisting of:
  - finding, in the de-identified entity lookup list, entity attribute data for entity attributes of that subject entity; and
  - performing a lookup of the found entity identifier in the one or more entity files of the source data to find entity attribute data for entity attributes of that subject entity.

* * * * *